United States Patent
Miles

(10) Patent No.: US 8,243,382 B2
(45) Date of Patent: Aug. 14, 2012

(54) METHOD OF GENERATING A POSITION ERROR SIGNAL, METHOD OF WRITING A DATA TRACK, AND METHOD AND APPARATUS FOR TESTING A HEAD

(75) Inventor: Michael Alan Miles, Rowlands Castle (GB)

(73) Assignee: Xyratex Technology Limited, Havant (GB)

( * ) Notice: Subject to any disclaimer, the term of this patent is extended or adjusted under 35 U.S.C. 154(b) by 871 days.

(21) Appl. No.: 12/097,591

(22) PCT Filed: Feb. 6, 2007

(86) PCT No.: PCT/GB2007/000402
§ 371 (c)(1),
(2), (4) Date: Jun. 16, 2008

(87) PCT Pub. No.: WO2007/091044
PCT Pub. Date: Aug. 16, 2007

(65) Prior Publication Data
US 2008/0267029 A1 Oct. 30, 2008

Related U.S. Application Data

(60) Provisional application No. 60/771,879, filed on Feb. 10, 2006, provisional application No. 60/817,084, filed on Jun. 29, 2006.

(51) Int. Cl.
*G11B 5/596* (2006.01)
*G11B 27/36* (2006.01)

(52) U.S. Cl. ...................... 360/77.08; 360/31

(58) Field of Classification Search .................. None
See application file for complete search history.

(56) References Cited

U.S. PATENT DOCUMENTS

| | | | | |
|---|---|---|---|---|
| 4,969,059 A | * | 11/1990 | Volz et al. | 360/78.04 |
| 5,867,341 A | | 2/1999 | Volz | |
| 5,949,602 A | | 9/1999 | Ishioka | |
| 6,091,564 A | | 7/2000 | Codilian | |
| 6,507,450 B1 | | 1/2003 | Elliott | |
| 6,992,852 B1 | | 1/2006 | Ying | |
| 7,706,092 B2 | * | 4/2010 | Ling et al. | 360/48 |
| 7,835,106 B2 | * | 11/2010 | Miles | 360/75 |
| 2003/0103284 A1 | | 6/2003 | Cheng | |

OTHER PUBLICATIONS

International Search Report issued in international application PCT/GB2007/000402, Apr. 26, 2007; 3 pages.

* cited by examiner

*Primary Examiner* — Andrew L Sniezek
(74) *Attorney, Agent, or Firm* — Pillsbury Winthrop Shaw Pittman LLP

(57) ABSTRACT

A method of generating a position error signal for a desired radial position of a read/write head relative to a data track of a disk is disclosed. The track has a plurality of servo bursts defining a plurality of servo nulls for the track, and are positioned such that they are at more than four different radial positions relative to the track, and define a predetermined locus having a known position relationship with the track. The method comprises determining a target null position on the null locus corresponding to the radial position of the head relative to the track; detecting the position of the servo null with the head; determining from the detected servo null position the position error of the head relative to the target null position; and, generating a position error signal.

16 Claims, 9 Drawing Sheets

| | |
|---|---|
| ⋯XXX⋯ | Servo Read Between Sectors |
| -ΘΘΘ- | Read Sectors |
| ............ | Track Dead Center |
| ........Π.... | Thermal Drift Before Compensation (Exaggerated) |
| - - - - | Threshold of Useful Data |

---XXX--- Servo Read Between Sectors
-OOO- Read Sectors
............ Track Dead Center
......Π... Thermal Drift Before Compensation (Exaggerated)
- - - - - Threshold of Useful Data ---XXX--- Servo Read Between Sectors
-OOO- Read Sectors
············ Track Dead Center
·······⊓··· Thermal Drift Before Compensation (Exaggerated)
- - - - - Threshold of Useful Data

METHOD OF GENERATING A POSITION ERROR SIGNAL, METHOD OF WRITING A DATA TRACK, AND METHOD AND APPARATUS FOR TESTING A HEAD

CROSS REFERENCE TO RELATED APPLICATIONS

This is the U.S. National Phase of PCT/GB2007/000402, filed Feb. 6, 2007, which in turn claims priority to U.S. provisional application Ser. Nos. 60/771,879, filed Feb. 10, 2006 and 60/817,084, filed Jun. 29, 2006, the entire contents of all of which are incorporated herein by reference.

The present invention relates to a method of generating a position error signal, a method of writing a data track, and a method and apparatus for testing a head.

In embodiments, the present invention relates generally to head media test apparatus such as are commonly known as "spin-stands" in the art.

Spin stands were first developed in the art as a tool for use during research and development to allow the performance of the various components of disk drives, for example the heads, disks and channels, to be evaluated and optimised. It is now common to also use spin stands in the field of disk drive manufacturing to test each manufactured read/write head or disk before it is assembled into a disk drive unit.

A typical test apparatus known in the art comprises a motor driven spindle on which a disk is mounted that can be written to and read by the head under test, and a support assembly for supporting the head under test and "flying" the head over the disk when spun. The test apparatus also comprises an arrangement to allow the head to be positioned over the disk. This typically comprises a coarse positioning device, such as an X-Y positioning stage, for positioning the head anywhere over the surface of the disk.

The coarse positioning device is used to position the head generally in the region of a test track on the disk. A fine positioning device, such as a piezo-element actuator or similar micro actuator, is typically also provided for fine positioning of the head. The fine positioning device is used to find and locate the head over the centre of the track and then to "micro-jog" the head over small increments from the track centre.

When conducting a test, the head is first positioned over the centre of the track, and the fine positioning device is then used to position the head at various radial positions on or across the track. Test data is written to the track and subsequently read back by the head at the various radial offsets of the head. Typically readings must be taken over several revolutions of the disk at each offset to reject noise. In this way a series of tests may be conducted, including for example so-called bit error rate (BER) bathtubs, track squeeze, track centre, read/write offset, etc.

Usually, the fine positioning device has a highly accurate internal sensor for determining the error between the desired position input to the fine positioning device (the so-called "commanded position") and the actual position achieved by the fine positioning device. This error term can be fed back into a control loop for the fine positioning device in order to reduce or eliminate any error and achieve a more accurate positioning. However, despite the fine positioning device having this feedback control, there is no way of the system directly determining any error that has been introduced between the desired or commanded head offset and the actual head offset. This means that the positioning of the head at the various offsets relative to the track centre is effectively open loop. In practice, this is undesirable, as noise from various sources and particularly from thermal drift can affect the system in a way that the internal sensor of the fine position sensor cannot "see" and which therefore the system cannot compensate for, thereby leading to error in both achieving the desired offset and maintaining the desired offset.

To address this, it has been suggested in the prior art to use servo tracks on the disk to allow the absolute position of the head on the disk to be determined. Under this scheme, the test track comprises two types of data. The first set of data is in the form of servo bursts, which are generally arranged in the form of a sectored servo track. These servo bursts in effect define the position of the test track on the disk and are used by the head to establish its position relative to the track in terms of a position error signal (PES), as is generally known in the art. The servo bursts may be pre-written to the disk before the disk is mounted in the test apparatus. More commonly, the servo bursts may be written by a head when the disk is first mounted in the test apparatus, as part of a disk initialisation process. Regardless of how the servo track is written, it is likely that the same servo track will be subsequently used for the testing of multiple heads (typically many hundreds or thousands of heads).

The second set of data is the test data, which is written interleaved with the servo bursts of the sectored servo track. This data is written anew and read back by each head tested in the apparatus to allow the read/write performance of the individual head to be measured.

The PES derived from the servo bursts is ultimately fed back to a servo controller and used in reducing any error in the commanded position of the head, for example due to thermal drift.

For example, U.S. Pat. No. 6,023,145 and U.S. Pat. No. 6,538,838 both generally disclose arrangements using a servo scheme of this form in a head media test apparatus.

Under these schemes, the arrangement of servo tracks and generation of a position error signal from the servo tracks is essentially similar to how the head positioning system typically operates in a head disk assembly in end use. However as will be explained this system is unsuited for use in a head test apparatus for a number of reasons.

FIG. 1A shows a track 1 having a typical prior art quadrature amplitude modulated servo burst frame 2. (The track 1, which is usually circular and concentric with the disk, has been shown here to be linear for simplicity). The servo burst frame 2 has four series of periodic magnetic transitions known as servo bursts: respectively the A-burst, B-burst, C-burst and D-burst $3a,b,c,d$. Each servo burst $3a,b,c,d$ is written within a servo frame 2 so as to repeat at half track radial intervals, and each has a different radial offset from the others. Typically there may be about 250 servo frames 2 circumferentially around the track 1. Typically each servo frame 2 around the track 1 additionally contains a unique track address (not shown) that can be decoded digitally to give a coarse position of the servo frame 2.

When a read/write head 4 (shown in FIG. 1A over the track centreline 5) is flown circumferentially across the track 1 and over the servo burst frame 2, each servo burst $3a,b,c,d$ is detected by the head in turn and gives rise to a signal having a strength proportional to the degree to which the head 4 radially overlaps the respective bursts $3a,b,c,d$. FIG. 1B shows how a quadrature amplitude modulated (QAM) position error signal (PES) is derived from these four signals. Two traces are derived: a first signal 6 derived from the A and B bursts $3a,b$ equal to $(A-B)/(A+B)$; and a second signal 7 derived from the C and D bursts $3c,d$ equal to $(C-D)/(C+D)$.

As shown in FIG. 1B, the signals 6, 7 provide a voltage reference that gives a measure of radial position of the head 4 relative to the track 1 which is quasi-linear in each quadrant Q1,Q2,Q3,Q4 of the track 1. As part of the demodulating process the pair of bursts 3a,b;3c,d chosen is the one that gives the most linear signal 6;7 for the quadrant in which the head is located (i.e. C and D for Q1, A and B for Q2, etc.). Thus a reasonably quasi-linear PES is generated for the head 4 whichever quadrant Q1,Q2,Q3,Q4 it is in. Nevertheless, even in each quadrant Q1,Q2,Q3,Q4 there will be some degree of linearity error which will introduce errors into the system if not corrected for.

In addition this servo scheme is likely to be affected by gain error. This is typically caused by variation in the width of the read element of the heads being tested. The width of the read element can vary up to 20% due to manufacturing tolerances. This variation in width will lead to a slightly different signal generated when detecting a given servo burst with different heads and thus to a gain error. The two traces 6a, 6b of the first signal shown in FIG. 1B correspond to head read elements of different widths 4a,4b as shown in FIG. 1A and show the effect of gain error (respectively drawn with full and broken lines).

It will be appreciated that there are positions of the head relative to the track where A=B or C=D, i.e. where the signals detected from the A-burst and B-burst or C-burst and D-burst are identical. At this position the gain and linearity of the head do not affect the accuracy of the signal derived from the servo burst. This position where A=B or C=D is named a "servo null" 8. As can be seen from FIG. 1B, for each quadrant Q1,Q2,Q3,Q4, the signal is generally most linear at the servo null 8 and at positions close to the servo null 8, and least linear at positions furthest away from the servo null 8.

It should be noted that other servo burst arrangements are possible, including for example amplitude modulated servo bursts and phase modulated servo bursts. All these suffer from the same basic problems caused by non-linearity error and gain error.

The linearity and gain errors are less of a problem in an end-use disk system as the head is normally only required to follow the track centreline, which is usually made to coincide with a null position. However as described above, for head testing it is desired to achieve head offsets at many positions across the track and to maintain these offsets for several revolutions of the disk. Thus high linearity, accuracy and repeatability of the PES are desirable at all radial positions across the track during head testing. Also linearity and gain error in the PES fed back to the closed-loop servo controller adversely affects the performance and stability of the controller. Also, because of head skew in an end-use disk system, it cannot follow the optimum null. It therefore takes even longer to characterise the linearity and gain of the head to the servo track prior to use. This is not acceptable in a head/disk test system where a high throughput of parts tested is required.

In order to mitigate to some extent the above problems inherent with the servo track arrangement of the prior art, the prior art has suggested that each head be characterised to the servo track before testing. This is generally done by finding the track centre, and then micro-jogging the head across the width of the track and calibrating the linearity and gain of the head to avoid errors being introduced into the system. However, this characterisation process is not practical in a production test environment because of the time taken to characterise each head under test to the servo tracks on the test medium.

U.S. Pat. No. 6,023,145 teaches a slightly different servo scheme. In this method the head is first moved to a commanded position using the internal sensor of the micro positioner for reference. At this commanded position the servo bursts are read by the head, and a position error term is determined from readings taken over several revolutions of the disk and stored in memory. This position error term is then used as a reference for the controller, in order to allow the head to be locked in the desired position even in the presence of thermal drift. However, this method has the disadvantage of requiring many revolutions of the disk in order to calculate the position error term accurately enough to provide an adequate reference. This makes the method only suited at best to use in a research and development laboratory, where it is more acceptable to keep the head at the same radial position for a large number of revolutions of the disk, thereby giving sufficient time for the position error term to be accurately determined. In contrast, in a production environment a full suite of tests are likely to be performed on the head. This calls for the head to be repeatedly micro-jogged across the track to develop micro track profiles, BER bathtubs, etc. Hence a lengthy calibration process at each micro-jogged position is prohibitively slow. Speed of testing is particularly important in a production environment as this directly affects the throughput of units tested and hence the production costs. For these reasons, the method of U.S. Pat. No. 6,023,145 is not suited to perform these tests in production testing.

In addition to the above described problems with the prior art, the general trend in disk drive technology is for the widths of the heads and tracks to decrease. The above mentioned problems are exacerbated as this trend continues.

For these reasons, known servo techniques from the field of disk servo design are of limited assistance in spin stands as they do not provide for very fine positional control across the radial extent of track needed when testing the head, and/or require prohibitively time-consuming characterisation of each head under test to the servo bursts written to the disk.

According to a first aspect of the present invention, there is provided a method of generating a position error signal for a desired radial position of a read/write head relative to a data track of a disk, wherein the track has a plurality of servo bursts defining a plurality of servo nulls for the track, the servo nulls being positioned such that there are servo nulls at more than four different radial positions relative to the track, the servo nulls defining a predetermined locus having a known position relationship with the track, the locus extending across the radial extent of the track, the method comprising: (a) determining a target null position on the null locus corresponding to said desired radial position of the head relative to the track in accordance with said known position relationship; (b) detecting the position of at least one servo null with the head; (c) determining from said at least one detected servo null position the position error of the head relative to the target null position; and, (d) generating a position error signal in accordance with said position error.

The above arrangements provide a position error signal that can be used in a continuous feedback system of absolute position regardless of where the head is positioned and regardless of whether the head is doing a track-to-track move or a micro-scan across the track for a BER measurement or cross track profile. This is accomplished by pre-calculating where the target null will occur prior to the head being moved to its intended destination. This target null is the absolute position on the disk relative the track and is used as the reference point for generating the position error signal. Because the absolute position is used, the target within the feedback loop stays the same, leading to the advantage that the PES may be averaged over multiple revolutions of the disk even when the head is micro-jogging across the track during the time when the samples are acquired for averaging. In contrast, in the system of U.S. Pat. No. 6,023,145 the target within the loop must be reset for every new position to which the head is moved, which requires an extended acquisition time to generate an acceptable reference.

This arrangement also allows the movement of the head to be changed from a step, settle and read method (which is the current method of conducting head media testing) to a method where the head is moved at a constant velocity across the written track, eliminating seek and settle times and further reducing test times.

The above arrangement also has the advantage that the radial positions of the servo nulls vary across the radial extent of the track owing to the locus and the track not being aligned with each other. As previously described, the servo bursts provide the most accurate, repeatable and linear relationship between the measured head offset and actual head offset in the region of the servo nulls (herein called the "linear zone" of the servo burst). Hence by having servo nulls with different radial positions relative to the track, the linear zones surrounding the plurality of servo nulls can be made to extend across a greater radial extent of the track than is the case with prior art servo arrangements where the servo nulls and hence the linear zones are radially aligned.

In general, this arrangement has the advantage that a high quality PES value can be obtained without having to characterise each individual head under test to the servo track of the disk as in the prior art. This saves a considerable amount of time when testing and therefore, in a production environment, reduces costs of manufacturing disk drive units.

In a preferred embodiment, step (b) includes detecting the position of at least the servo null radially nearest the head. This arrangement has the advantage that at any radial position of the head relative to the track the head can derive a high quality, repeatable PES based on the servo null that is radially closest to it and that provides the most accurate PES.

In a further preferred embodiment, step (b) includes detecting the position of a plurality of servo nulls and step (c) includes interpolating between said plurality of null positions in order to find said position error. This allows further accuracy to be obtained by interpolating as required between the discrete servo burst frame samples to determine a target null position that is not constrained to be coincident with a servo null. Also greater accuracy can be obtained by interpolating between a large number of servo samples to find the position error of the head in order to reject noise present in the samples.

The position error signal may be averaged over successive revolutions of the disk. Because a target null position is pre-calculated before the head moves to a new position and the PES is generated in relation to this target null, the PES effectively has the same reference point for all positions of the head. Therefore, the PES may be averaged over successive revolutions of the disk before being fed to the servo controller with no calibration being necessary between moves. This provides further accuracy and noise rejection in the PES signal.

In an embodiment, the desired radial position of the head is selected so as to coincide with a servo null.

In a most preferred embodiment, the track is concentric with the disk, and the plurality of servo nulls are circumferentially spaced and have different radial positions at each circumferential position.

In a preferred embodiment, the position of the servo nulls extend across at least a majority of the radial extent of the track. This has the advantage that whatever the radial position of the head, it is likely to be close to a servo null and can hence derive a linear PES from at least that servo null. In a preferred embodiment, the servo nulls have radial positions that are evenly spaced. The circumferential positions of the servo nulls may be evenly spaced. This allows a high quality linear PES to be generated from the servo bursts. In a preferred embodiment, the position of the servo nulls extend successively in a single radial direction on going round the track.

In the preferred embodiment, the radial positions of the servo nulls vary linearly with circumferential position. This has the advantage of making the interpolation between nulls more simple to implement.

Preferably the servo bursts are formed in respective servo sectors of a sectored servo track. This allows the circumferential position of a servo burst to be obtained, for example by providing servo sector identifiers that can be read by the head, or by keeping a count of the number of servo sectors crossed by the head.

The position of the servo nulls may define at least part of at least one spiral of servo nulls on the disk. This allows a single spiral servo track to be written to the disk, which can be used to provide a PES at any radial position on the disk. This also provides the advantage that the spiral may be written contiguously so that servo tracks can be written across the disk with minimal errors being introduced by the effects of thermal drift. Preferably the pitch of the spiral is the width of the track. This provides the greatest number of servo nulls per track and hence greater accuracy.

In a further embodiment, the servo null locus is concentric with the disk. The track may define a sine wave. The sine wave may have a wavelength equal to the track circumference. A plurality of servo null loci may be written to the disk. The track may be written to encompass more than one servo null locus.

In an embodiment, the disk is initially free of servo bursts, the method comprising performing, before step (a), the step of writing said servo bursts to the disk.

The servo bursts are preferably quadrature amplitude modulated servo bursts. Alternatively, the servo bursts may be amplitude modulated servo bursts or phase modulated servo bursts, or any other servo burst having a null.

In an embodiment, there is provided a method of testing a read/write head, the method comprising: commanding the head to a desired position relative to a track of a disk; generating a position error signal for the difference in the actual and desired position of the head as described above; controlling the position of the head with a closed loop controller arranged to reduce the position error signal substantially to zero; and, testing the head.

According to a second aspect of the present invention, there is provided a method of writing a data track to a disk with a read/write head as part of a method of testing the head in a head media test apparatus, the disk having a plurality of servo bursts defining more than four servo nulls, the method comprising: writing said data track to coincide with said more than four servo nulls, such that the servo nulls define a pre-determined locus having a known position relationship with the track, the locus extending across the radial extent of the track.

In a preferred embodiment, the track is concentric with the disk, and the plurality of servo nulls are circumferentially spaced and have different radial positions at each circumferential position. The position of the servo nulls may extend successively in a single radial direction on going round the track. The radial positions of the servo nulls may vary linearly with circumferential position. The position of the servo nulls may define at least part of at least one spiral of servo nulls on the disk.

In another embodiment, the servo null locus is concentric with the disk. The track may define a sine wave.

In an embodiment, the disk is initially free of servo bursts, the method comprising performing, before the step of writing the data track, the step of writing said servo bursts to the disk.

According to a third aspect of the present invention, there is provided apparatus for testing a read/write head, the apparatus comprising: a disk having a data track, wherein the track has a plurality of servo bursts defining a plurality of servo nulls for the track, the servo nulls being positioned such that there are servo nulls at more than four different radial positions relative to the track, the servo nulls defining a predetermined null locus having a known position relationship with the track, the locus extending across the radial extent of the track; a positioner for positioning a said head over a radial position on the disk; a processor arranged to: (a) receive a desired radial head position relative to the track; (b) determine a target null position on the null locus corresponding to said desired radial position of the head relative to the track in accordance with said known position relationship; (c) detect the position of at least one servo null with the head; (d) determine from said at least one detected servo null position the position error of the head relative to the target null position; and, (e) generate a position error signal in accordance with the position error; and, a feedback controller arranged to receive said position error signal as a feedback input, and to cause said positioner to position said head so as to reduce said position error signal substantially to zero.

According to a fourth aspect of the present invention, there is provided a disk, the disk having at least one circular concentric track having a plurality of servo bursts defining a plurality of servo nulls for the track, the servo nulls being positioned such that there are servo nulls at more than four different radial positions relative to the track, the servo nulls defining at least part of a spiral on the disk having a known position relationship with the track, the locus extending across the radial extent of the track.

According to a fifth aspect of the present invention, there is provided a method of testing a read/write head suitable for use in a disk drive, the method comprising: positioning the head over a radial position on a spinning disk medium corresponding to a track on the disk; commanding the position of the head with a periodic movement signal such that the radial position of the head moves notionally along a periodic path, the head traversing n wavelengths of the periodic path as the disk rotates m revolutions, where n and m are integers; reading from the disk using the head at a plurality of points along the periodic path; and, characterising the head using said readings.

The periodic movement signal has the advantage that the head is able to read data from the track at various radial positions in a single pass (a pass being defined as an operation where test data is acquired by the read/write head continuously without stopping to reposition the head at a different offset). In comparison, in the prior art arrangements, multiple passes are needed, one pass being needed for each radial offset position of the head. The arrangement of this embodiment has the advantage that less time is spent positioning the head at desired offsets of the disk and more time is spent actually acquiring test data.

The head traverses n wavelengths of the periodic path as the disk rotates m revolutions. This has the advantage that the periodic path "closes" in that the head returns, after m revolutions of the disk, to the same position relative to the disk surface and follows the same path relative to the disk surface. This means that a further set of test readings can be taken by the read/write head at substantially the same points relative to the disk surface. Again, it is unnecessary to stop taking test readings to reposition the head. This again leads to savings of time in the testing process.

In one embodiment, n=1 and m=1. This conveniently allows the wavelength of the periodic path to coincide with a single full revolution of the disk.

In a preferred embodiment of the method, said readings are taken at the same positions within each periodic path relative to the disk, the method comprising averaging said readings for respective points on the disk over different revolutions of the disk. Averaging the readings from the read/write head allows a more accurate set of test readings to be produced where the effects of noise and/or other factors resulting in spurious readings are mitigated. This allows the read/write head under test to be characterised with greater accuracy.

In a preferred embodiment, the commanded periodic path is substantially a sinusoidal path.

In a further preferred embodiment, the commanded position of the head moves the head over the full radial extent of the track. This allows for example a full bathtub BER test to be performed in a single pass.

In a preferred embodiment, the method comprises reading optically-readable marks that rotate with the disk using an optical reader and determining the rotational position of the disk accordingly; and, calculating the commanded periodic path with reference to said determined rotational position of the disk. This allows precise co-ordination between the period of the commanded periodic path and the rotation of the disk. This allows the commanded periodic path to "close" with good precision.

In a further preferred embodiment, the method comprises providing at least one error signal in the position of the head to a servo controller, the servo controller being arranged to control the position of the head in accordance with said at least one error signal and said commanded periodic movement signal. The track may have servo bursts associated therewith. The method may comprise: detecting the servo bursts with the head; demodulating the detected servo bursts to determine the position error signal of the head; sampling the position error signal at positions of said periodic movement signal that correspond to the desired track centre points; and, determining the trend in the samples over a plurality of samples to provide said at least one error signal. This allows the position of the head to be controlled to compensate for noise or drift that has affected the positioner and caused the actual offset of the head to differ from the commanded offset of the head. This has the advantage that the bandwidth of the samples is relatively low, allowing the controller function to be more simply implemented. In addition, the samples are taken (at least notionally) from the same position relative to the radial position of the track, namely the centre of the track, where the servo nulls are positioned. This means that the adverse effect of any non-linearity of the PES relative to radial position of the head over the track is largely obviated. This provides the advantage that individual heads do not have to be characterised to the individual track before testing. Thus, the method may comprise testing the head without characterising the head to the servo track. Furthermore, this embodiment provides the advantage that it is not necessary to re-find the track centreline continuously during test before commanding the head to each position. Drift can be eliminated in real-time, enabling a greater proportion of test time to be spent acquiring test data rather than frequently searching for and relocating the head over the track centreline. The time taken to test the head is therefore reduced, leading to more efficient, cost-effective testing.

According to a sixth aspect of the present invention, there is provided apparatus for testing a read/write head, the apparatus comprising: a spindle for mounting to and rotating a disk medium; a positioner for positioning a read/write head over a radial position on a said disk medium; a controller constructed and arranged to command the positioner to position the head with a periodic movement signal such that the radial position of the head moves notionally along a periodic path in which the head traverses n wavelengths of the periodic path as the disk rotates m revolutions, where n and m are integers; and, a data acquirer for taking readings from the disk using the head at a plurality of points along the periodic path.

Embodiments of the present invention will now be described by way of example with reference to the accompanying drawings, in which.

Figure 2:
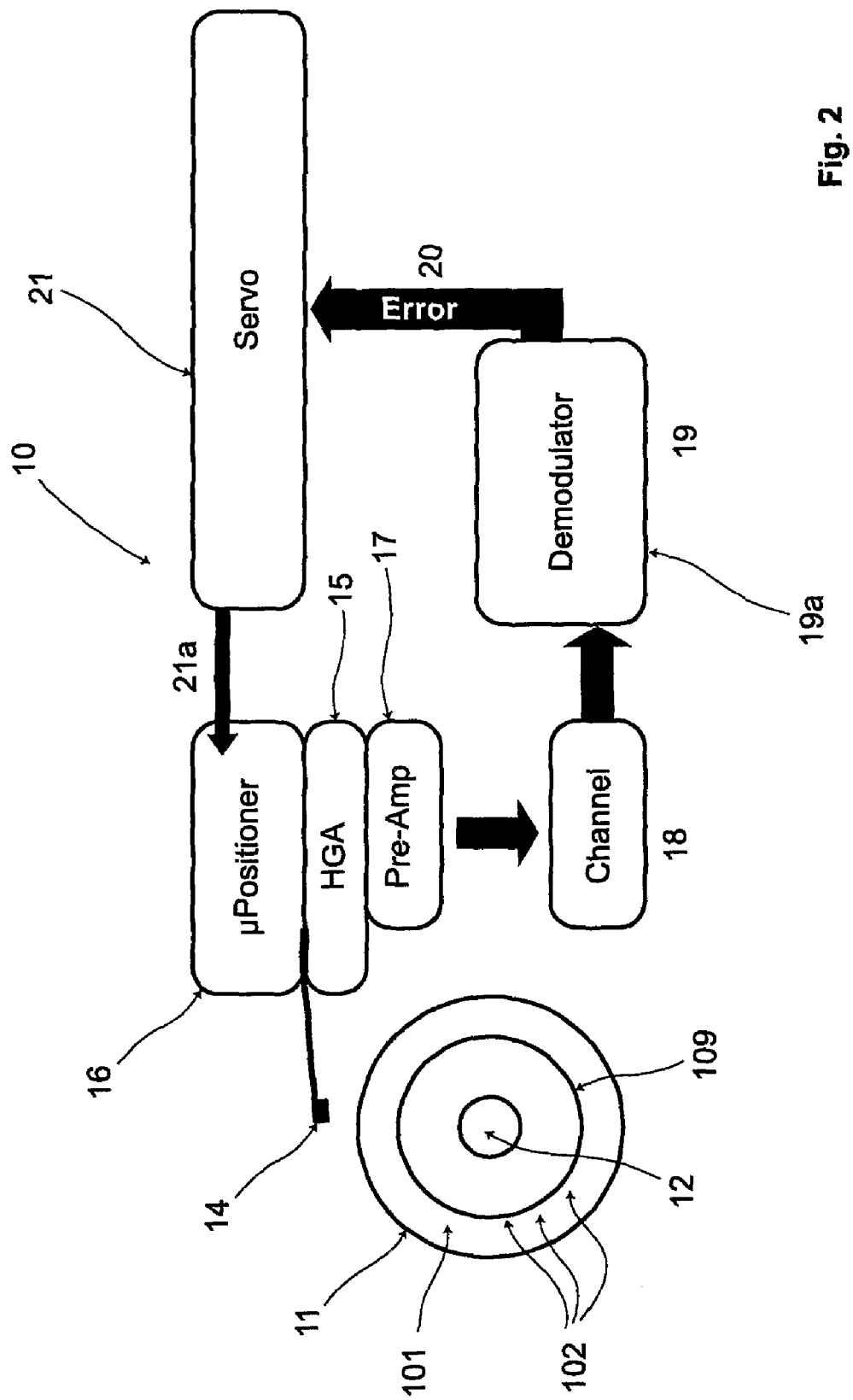
FIG. 2 shows schematically an example of a read/write head test apparatus in accordance with an embodiment of the present invention.

Referring to FIG. 2, an example of a test apparatus 10 in accordance with an embodiment of the present invention is shown. A magnetic disk 11 is mounted to a spindle 12. The disk 11 has at least one circular concentrically arranged test track 101, having servo bursts 102 arranged in the form of a sectored servo track 109 (shown most clearly in FIG. 3).

A read/write head 14 which is to be tested by the apparatus 10 is mounted to a head gimbal assembly 15. The head gimbal assembly 15 is mounted on a micro actuator 16. This is preferably a single axis micro actuator 16. However, in other embodiments the micro actuator 16 can be a micro positioner in any suitable form having any number of linear or rotational axes. The micro actuator 16 is operable to make fine positional adjustments to the head 14 relative to the disk 11.

The positioning of the head 14 by the micro actuator 16 is controlled by a feedback control loop. A low frequency servo controller is preferably used, having a bandwidth between 1 Hz and 10 Hz. It is preferred for the test apparatus 10 to operate at relatively high rpm to reduce test time, for example about 12000 rpm (about 200 revolutions per second). As will be described, the test apparatus 10 acquires one position error signal sample per revolution. This provides an adequate sample rate to support the required bandwidth.

A pre-amplifier 17 amplifies the data detected by the head 14. The detected data corresponding to the servo bursts 102 is passed via a channel 18 to a demodulator 19. As will be discussed in detail in the following, demodulator 19 is generally operable to generate a PES 20 from the servo bursts 102. This PES 20 is fed back to a servo controller 21. The demodulator 19 receives a commanded input 19a corresponding to the desired radial offset of the head 14. This offset may be for example relative to the centreline of the track 101. The servo controller 21 is operable to produce a signal output 21a for the micro actuator 16 to cause the actuator 16 to position the head 14. The servo controller 21 is generally arranged to position the head 14 to reduce the PES 20 to zero. This operation of the servo controller 21 may be accomplished by any suitable technique, such as is known in the art, and is not discussed in detail herein.

Figure 3:
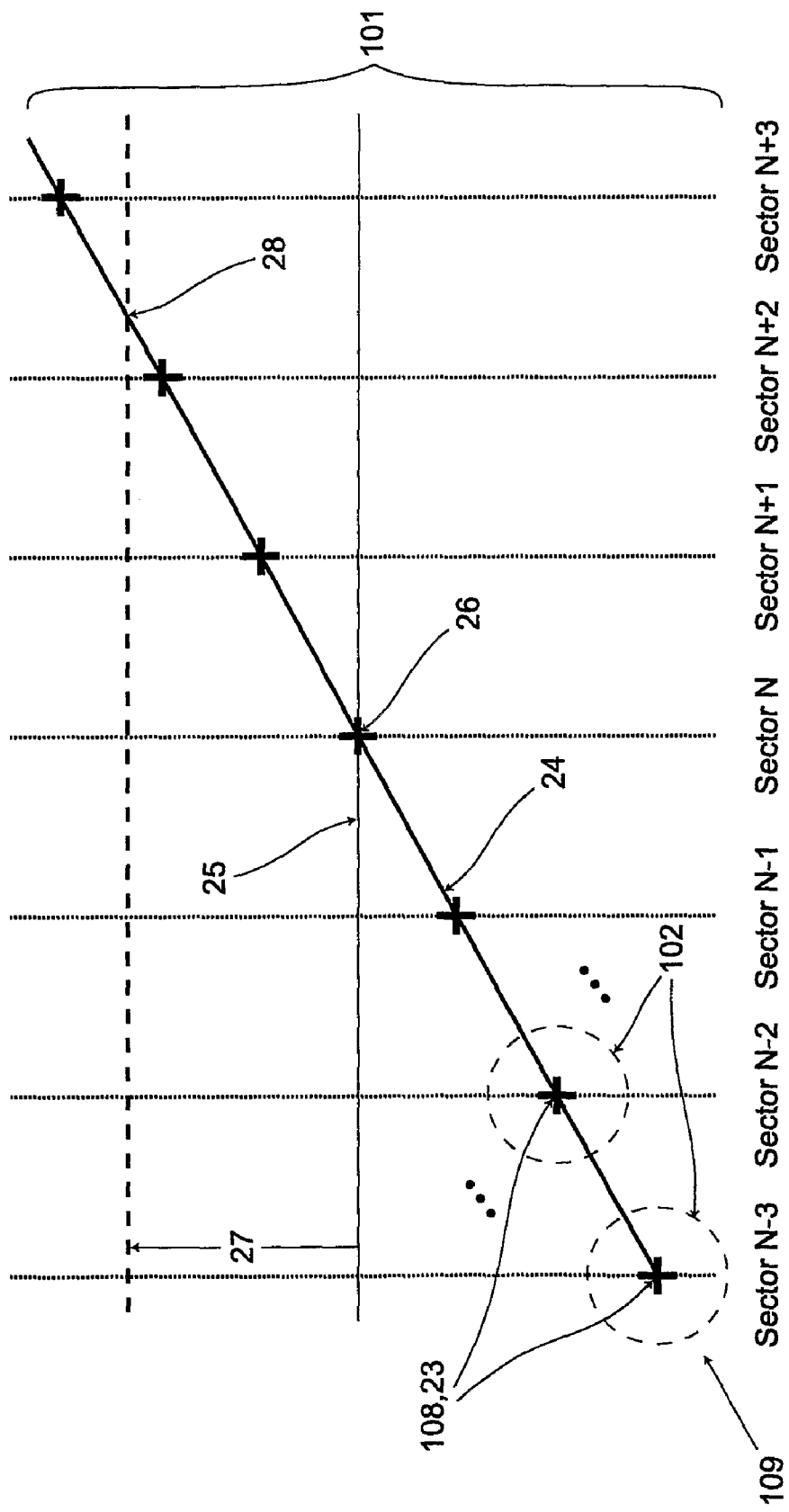
FIG. 3 shows an example of a layout of the servo nulls of a servo track in accordance with an embodiment of the present invention.

FIG. 3 shows (not to scale) a test track/data track 101 having a preferred layout of servo bursts 102 (shown schematically) in the form of a sectored servo track 109. The servo bursts 102 are shown over a segment of the complete test track 101, from sector n−3 to sector n+3. The track 101 is circular and concentric with the disk 11. (It should be noted that the circular track has been projected onto a linear axis in FIG. 3 to illustrate more clearly the properties of the servo track).

Figure 1A:
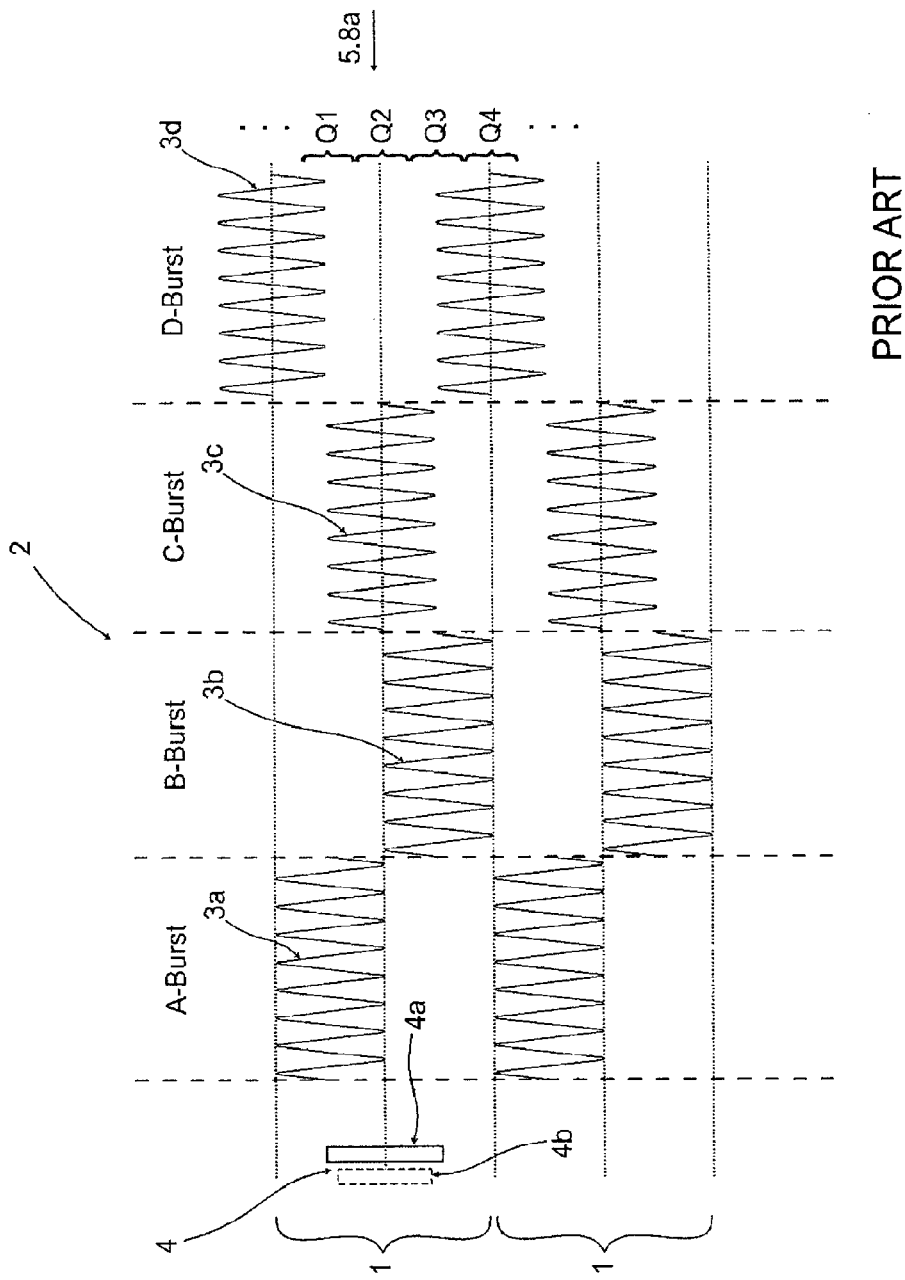
FIG. 1A shows an example of a prior art QAM (quadrature amplitude modulated) servo burst.
Figure 1B:
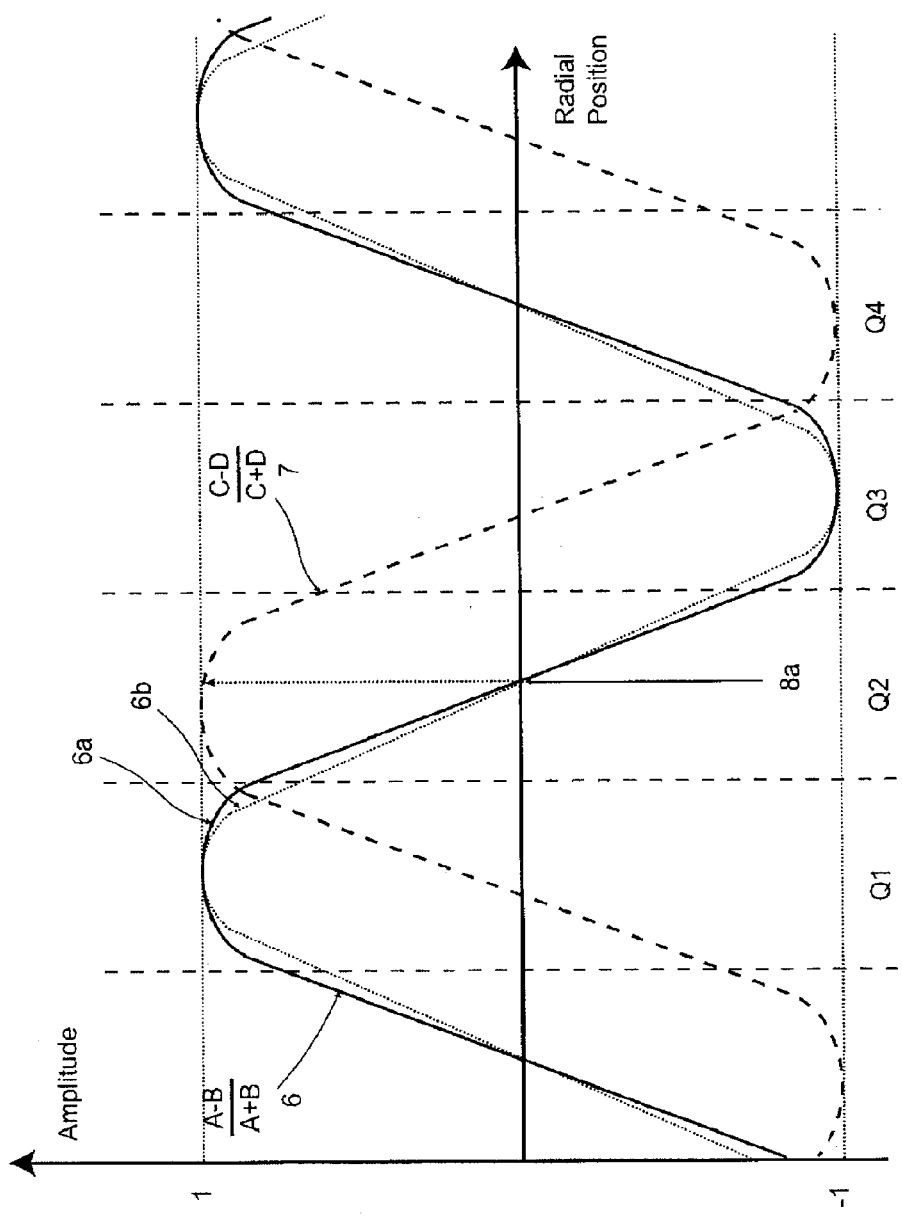
FIG. 1B shows an example of a PES (position error signal) derived from the servo burst of FIG. 1A.

In use, data is written to and read from the track 101 on the disk 11 interleaved with the sectored servo track 109. The servo bursts 102 of each servo sector provide servo nulls 108. The preferred servo bursts 102 are QAM (quadrature amplitude modulated) servo bursts, as for example shown in FIG. 1, such that each servo null 108 is provided by a pair of associated servo bursts 102. However other suitable types of servo bursts 102 known in the art for providing servo nulls may be used. For reasons of clarity, FIG. 3 does not show the form of the servo bursts 102 themselves. Instead, FIG. 3 shows the location of the servo nulls 108 provided by the various servo bursts 102 in relation to the track 101.

In a preferred embodiment, the radial positions 23 of the servo nulls 108 vary linearly with the circumferential positions of the servo nulls 102. FIG. 3 shows the linear relationship or locus 24 of the positions of the servo nulls 108. As will be readily appreciated, where a sectored servo scheme is employed, the radial positions 23 of the servo nulls 108 lie on and define the locus 24 but will do so having discrete positions. Hence FIG. 3 shows the locus 24 of the discrete servo null positions 23. It is preferred that the servo nulls 108 are evenly radially spaced. It is also preferred that the servo nulls 108 are evenly circumferentially spaced. In an example, if it is assumed that a typical number of servo sectors is 250 and that the servo sectors take up half of the track 101, then each sector is equivalent to 0.2% of the circumference of the track 101.

Other relationships between the radial positions and circumferential positions of the servo nulls 108 other than linear are contemplated. In any case, preferably the radial position of successive servo nulls 108 varies monotonically with circumferential position. Preferably the form of the locus 24 is predetermined and known to the system beforehand.

FIG. 3 shows that for the current position of the head 14 a null 26 occurs on sector N for a concentric read position 25. As the head 14 flies circumferentially over the track 101 it detects each servo burst 102 in turn. The detected signal from the servo bursts 102 is demodulated to provide a servo sample for each servo burst 102, measuring the radial position of the servo null 108 of the servo burst 102 relative to the head 14.

The signal from this servo burst 102 is used to generate the error signal to correct for any thermal drift. To reduce the noise in this signal, the bursts either side of the target may be read and if necessary averaged or interpolated using the known relationship of the locus 24 to determine a more accurate null position. As previously mentioned, non-linearity error and gain error are reduced near this null position.

Referring again to FIG. 3, if it is now desired to microjog the head 14 0.5% of the track width to a new radial position 27a then the following steps are taken. First, a new target null position 28 is calculated for the desired radial position 27a of the head 14 by using the known relationship of the locus 24.

In this example the target null position 28 lies midway between sectors N+2 and N+3. The head 14 is then commanded to the approximate target position 27a using the micro actuator 16 and its internal sensor. The servo nulls 108 are read by the head 14. Either all servo nulls 108 can be read or only those near the target radial position 27a can be read. Interpolation is used in the detected null signals in accordance with the known relationship of the locus 24 to find the actual null position 28 where the head crosses the locus 24. The difference in the position of the target null position 28 and the detected null position is used to generate the position error signal 20.

As will be appreciated, this method of calculating the target null position 28 for the desired radial offset of the head 14 before the head 14 is moved and then generating a position error signal 20 relative to this target null position 28 results in a position error signal 20 that will always be zero when the head is at the target position 27a. This is true at whichever target position 27a is selected relative to the track 101. This technique may be used for small microjogs across the track 101 or scaled to moves of several tracks 101. This technique may be used to generate a PES for any desired radial position of the head 14 relative to the track 101, so long as the locus 24 extends radially to the same extent as the track 101. Radial positions beyond the track 101 can similarly be used as long as the locus 24 extends this far.

In another embodiment the target position 27a can be selected to coincide with whichever is the nearest servo null 108 at that radial position. In this case, the resolution in the positioning of the head 14 is limited by the number of servo nulls 108 on the locus 24.

Figure 4A:
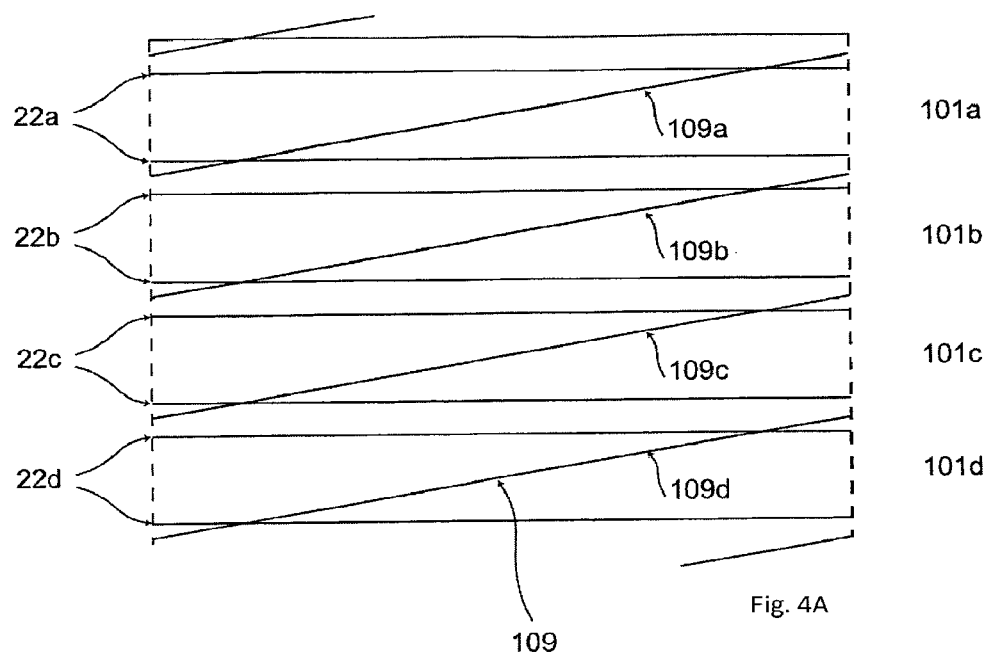
FIGS. 4A and 4B show examples of a spiral servo track in accordance with embodiments of the present invention.
Figure 4B:
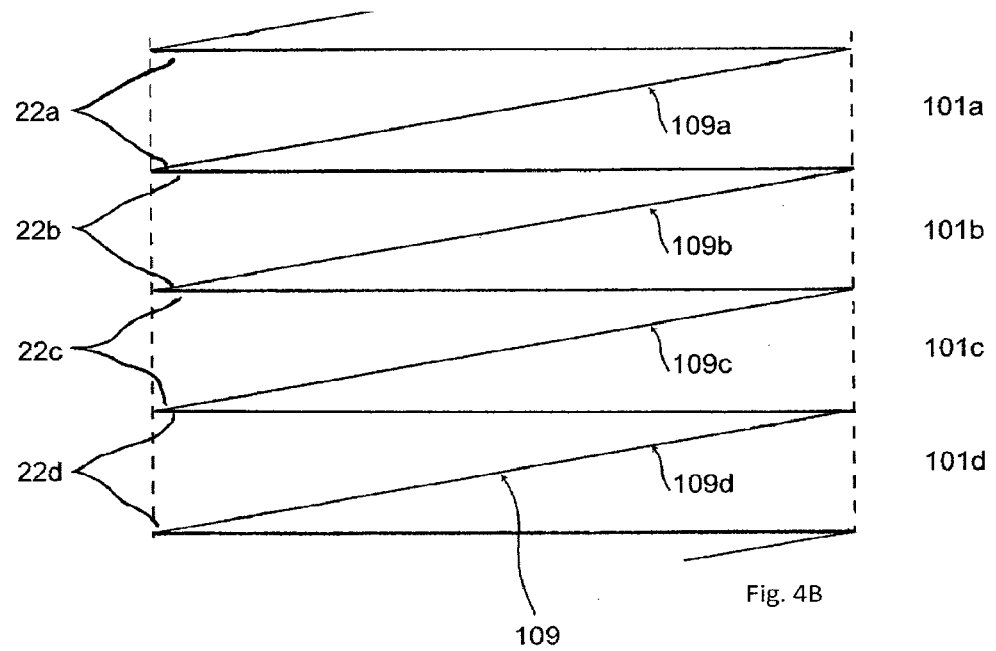

Preferably the servo nulls 108 extend at least across the entire radial extent of the test track 101. The servo nulls 108 may extend beyond the radial extent of the track 101. Indeed, the servo track 109 may extend beyond the test track 101 shown in FIG. 3 to other, radially adjacent tracks 101 on the disk 11, with the servo nulls 108 continuing their locus 24. In this way, as shown schematically in FIG. 4A, a single continuous servo track 109 may be written to the disk 11 in the form of a spiral. Segments of this spiral servo track 109 provide in effect a respective servo track 109a,109b,109c, 109d to a plurality of adjacent concentric circular data tracks 101a,101b,101c,101d (as shown in FIG. 4A by track edges 22a,22b,22c,22d) on the disk 11. FIG. 4B shows another example where the pitch of the spiral is the width of the track.

It is preferred that the servo bursts 102 are written with the same micro actuator 16 that is used when positioning the head 14 by micro-jogging during testing of the head 14. This allows the writing and reading of the servo bursts 102 to be coordinated so that any inaccuracies in the micro actuator 16 effectively cancel out. This is generally in accordance with the standard method of writing servo tracks 109 in a production testing environment, where a series of tracks 109 is written as part of an initialisation routine and remain for several hundred or thousands of heads 14 before repeating the process.

It is preferred that repeatable errors, either written-in RRO (repeatable run out) or mechanically induced NRRO (non-repeatable run out), are compensated for dynamically in order to achieve higher accuracy in positioning the head 14 and thus testing the head 14. The RRO may be characterised at initialisation of the test apparatus 10, in accordance with known techniques in the art. The mechanical error is preferably dynamically compensated for. Preferably an algorithm interpolates each measurement on a sector-to-sector basis, based on reading PES 20 independent of radial position. Preferably the system is arranged so that at least 20 revolutions of the disk are used to accumulate enough RRO data to prime the system before the servo controller 21 is engaged on the PES 20 to compensate for thermal drift. It is envisaged that this will take no more than 100 ms. This could be done in parallel with the test operation or alternatively run as a stand alone operation if the overhead is acceptable for the application.

Figure 5:
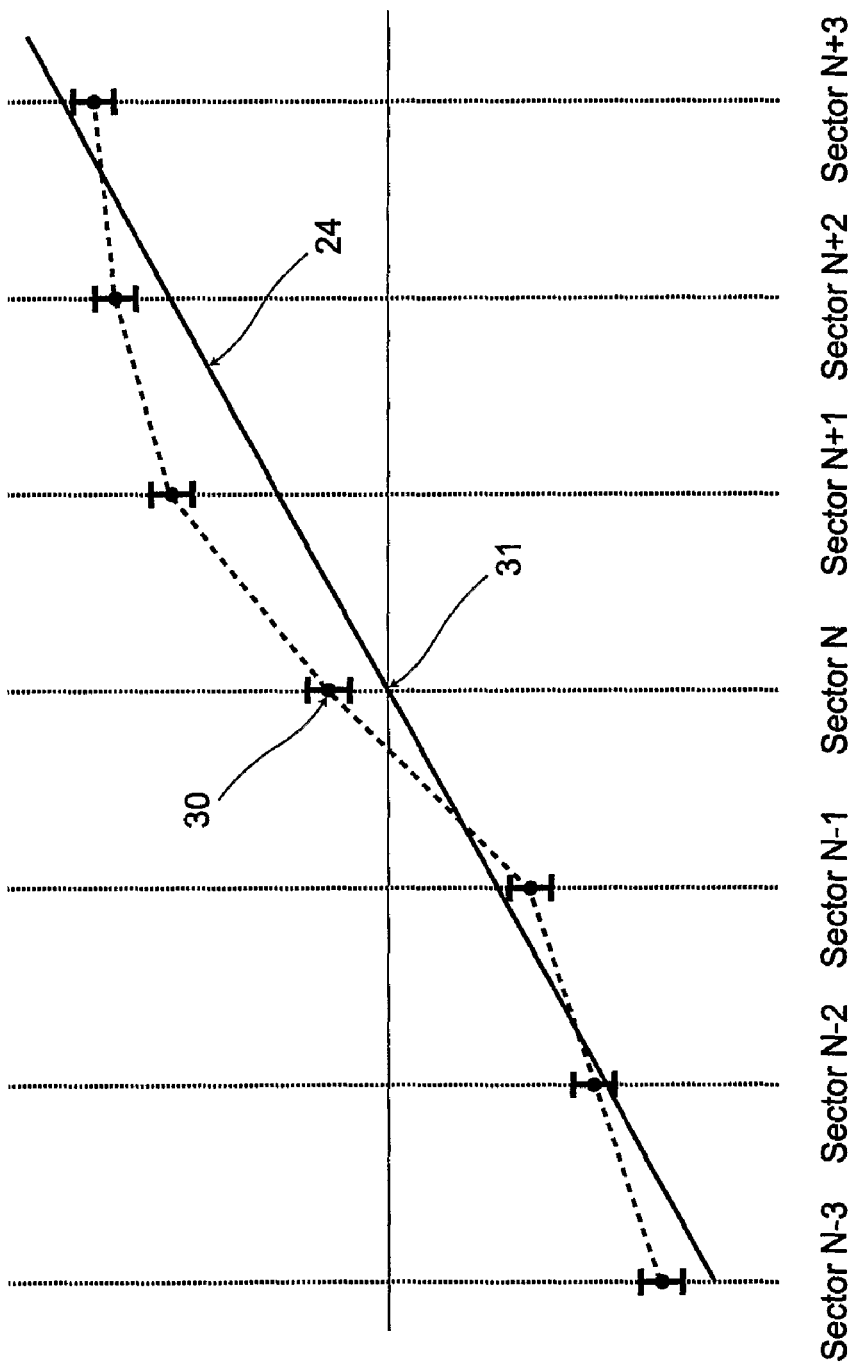
FIG. 5 shows an example of RRO and NRRO error in reading the servo track of FIG. 3; and, FIG. 6A shows an example of an idealised sinusoidal commanded head trajectory suitable for use with the test apparatus of FIG. 2.

Referring to FIG. 5, the locus 24 of ideal nulls 31 and an actual set of detected servo nulls 30 is shown. For the detected servo nulls 30, the points show the RRO component of the error (for example caused by eccentricity in the spindle) and the error bars show the NRRO component of the error (for example caused by mechanical vibration). To determine the RRO component, detected samples 30 need to be averaged over multiple revolutions of the disk in order to reject the NRRO component. The error between each sample 30 and the ideal null 31 is characterised and kept in a dynamic RRO table, which is used to determine the position of the servo nulls 108. The repeatable component is constant for each servo burst 3 and can therefore be used when micro-jogging across tracks 101 without the need to update the table.

Other arrangements of the servo bursts 102 and the track 101 are envisaged as alternatives to the specific embodiment described above having a circular concentric data track 101 and a linear/spiral locus 24 of servo nulls 108. For example, it is not necessary to write a circular, concentric data track 101. The data track 101 could be written in the form of a spiral or sine wave, and the locus of servo nulls 108 could be concentric. Other forms are possible. In each case, the locus of servo nulls 108 extends across the radial extent of the track 101. Here, radial extent of the track 101 means relative to the track 101 rather than relative to the disk 11. This allows for a point to be found on the locus 24 where the head will cross the locus 24 and detect a servo null 108 when following the track 101 at that position at all radial positions on the track 101.

It is also envisaged that the locus 24 may extend over a number of adjacent data tracks 101, or over only a part of a data track 101, depending on the area of the disk 11 of interest according to the particular test being performed.

Figure 6A:
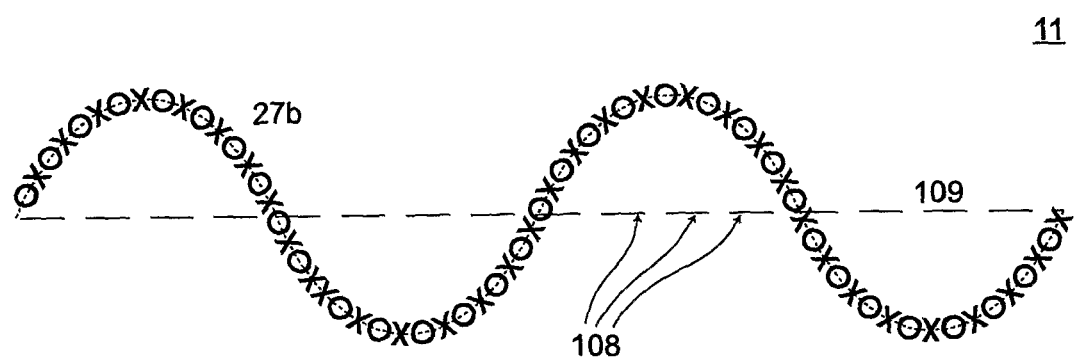
FIG. 6B shows an example of the trajectory of FIG. 6A with noise being present.
FIG. 6C shows an example of the trajectory of FIG. 6A with thermal drift being present.
Figure 6B:
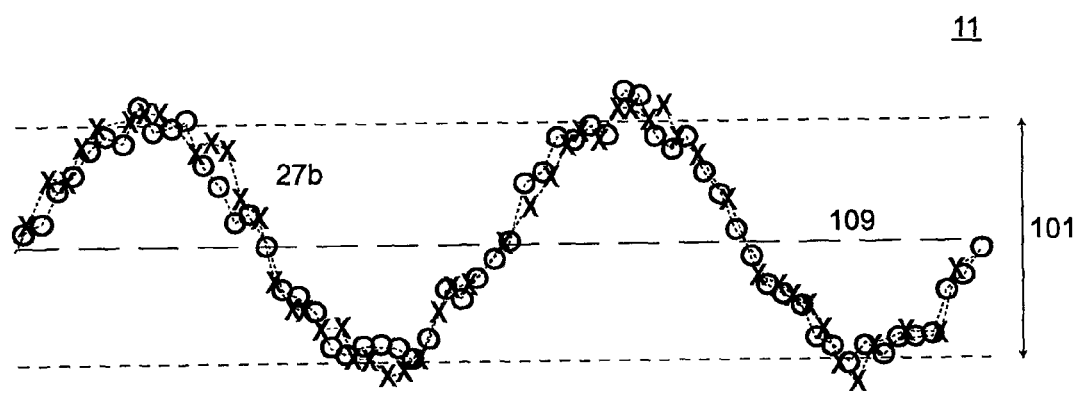

In one example, the position of the head 14 is commanded to describe a periodic path over the surface of the disk 11. A sinusoidal head trajectory 27b is preferred for simplicity, though in principle any reasonable periodic path may be used. FIG. 6A show an idealised sinusoidal head trajectory. FIG. 6B shows a sinusoidal head trajectory with some noise present. The disk 11 has at least one track 101 that is circular and concentric with the disk 11. The centreline of the sinusoidal path 27b is preferably coincident with the centreline of the track 101. The amplitude of the sinusoid is preferably such that the head 14 is caused to move back and forth across the entire radial extent of the track 101.

The wavelength of the sinusoid 27b is preferably such that an integral number of complete wavelengths are precisely coincident with a complete revolution of the disk 11. Alternatively, a wavelength may be used where an integral number n of wavelengths is coincident with an integral number m of complete revolutions of the disk 11. It will be understood that the key consideration here is that the head 14, after some number of revolutions of the disk 11 (preferably just one revolution), returns to following the same path relative to the surface of the disk 11, such that a repeat reading can be taken of the data under the head 14.

Other periodic paths other than sinusoidal paths are contemplated as long as they are periodically applied to the head 14 and move the head 14 continuously over at least a portion of the radial extent of the track 101 and position the head 14 back where it started radially before starting the next period.

It is necessary that the particular coincidence between the wavelength of the commanded head position 27b and the number of complete revolutions of the disk 11 is achieved with a high level of precision. In order to achieve the precise coincidence of the wavelength of the sinusoid and revolution of disk 11, an optical clocking technique may be used. An example of this is disclosed in our commonly assigned U.S. patent application Nos. 60/695,845 and 11/480,582 entitled "METHODS AND APPARATUS FOR GENERATING A CLOCK SIGNAL, FOR WRITING SERVO TRACKS, AND FOR CHARACTERISING TIMING ERRORS IN A SERVO TRACK WRITER" filed on Jul. 5, 2005 and Jul. 5, 2006 respectively, the entire contents of which are hereby incorporated by reference. Briefly, movement of at least one mark that moves synchronously with the disk 11 is detected by an optical detector to provide an output signal that can be processed to provide a clock signal. The mark or marks may be provided by a grating fixed to the disk 11, or some part that rotates synchronously with disk 11, such as the motor spindle 12 or some part of the motor itself.

Using the preferred sinusoidal head trajectory, the head 14 is made to measure test data across the full extent of the track 101. In prior art arrangements this had to be done by commanding the head 14 to a desired radial offset in relation to the track 101, and making measurements over several revolutions of the disk 11 at this offset; the offset would then be changed and the process repeated until the desired profile was built up across the radial extent of the track 101. By using the sinusoidal commanded head position of the present example, in principle, only one revolution of the disk 11 is required to acquire the necessary data across the width of the track 101. However, in practice it is preferred to use several revolutions of the disk 101 so that a greater number of readings can be taken for noise rejection purposes.

Figure 6C:
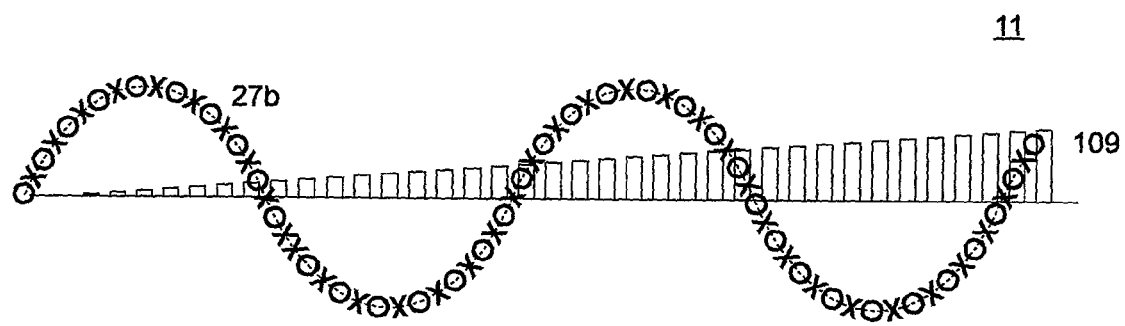

In the preferred scheme, where the commanded position of the head 14 is a sinusoid, the PES 20 is sampled when the position of the head 14 coincides with the track centreline (i.e. when the sinusoid or other periodic signal is at a multiple of $\pi$ radian intervals). These samples are collected over a number of revolutions of the disk 11 and averaged or low pass filtered. The values obtained give a very low bandwidth measure of error caused by thermal drift (or predominantly by thermal drift). FIG. 6C shows an example of how the commanded sinusoidal position of the head 14 can drift off-track due to thermal drift effects (shown in exaggerated form). In a non-drifting situation, these values should be zero.

This technique has the advantage of being simple to implement. Also, the PES samples 20 are obtained at the track centreline, coinciding with the positions of the servo nulls 108 of the servo track 109 and thus the effects of possible non-linearity and variation in gain of the PES signal 20 are largely obviated. It is therefore not necessary to characterise the head 14 to the track 101 to attain an accurate measure of the thermal drift of the head 14. Drift can be detected and eliminated in real-time, enabling a greater proportion of test time to be spent acquiring test data rather than calibrating the head 14 to the track 101. The time taken to test the head 14 is therefore reduced leading to more efficient, cost-effective testing.

Embodiments of the present invention have been described with particular reference to the example illustrated. However, it will be appreciated that variations and modifications may be made to the examples described within the scope of the present invention.

For example, examples of preferred embodiments of the present invention have been described with reference to performing BER bathtub tests on the read/write head of a magnetic disk. However, as the skilled person will readily appreciate, other types of head test could be performed in accordance with the principles of the present invention. Similarly other types of head for reading other types of media could be tested in accordance with the principles the present invention.

The invention claimed is:

1. A method of positioning a head relative to a disk in a test apparatus, the method comprising:
   commanding the head to a desired radial position relative to a track of a disk,
   wherein the track has a plurality of servo bursts defining a plurality of servo nulls for the track, the servo nulls being positioned such that there are servo nulls at more than four different radial positions relative to the track, the servo nulls defining a predetermined locus having a known position relationship with the track, the locus extending across the radial extent of the track;
   generating a position error signal for the difference between the actual radial position and the desired radial position of the head by:
   (a) determining a target null position on the null locus corresponding to said desired radial position of the head relative to the track in accordance with said known position relationship;
   (b) detecting the position of at least one servo null with the head;
   (c) determining from said at least one detected servo null position the position error of the head relative to the target null position; and,
   (d) generating a position error signal in accordance with said position error; and,
   controlling the position of the head with a feedback controller arranged to reduce the position error signal substantially to zero; and,
   writing and/or reading test data to the disk with the head,
   wherein step (b) includes detecting the position of a plurality of servo nulls and step (c) includes interpolating between said plurality of null positions in order to find said position error, said interpolation being calculated in accordance with the known position relationship.

2. A method according to claim 1, wherein step (b) includes detecting the position of at least the servo null radially nearest the head.

3. A method according to claim 1, wherein the position error is averaged over successive revolutions of the disk to generate the position error signal.

4. A method according to claim 1, wherein the desired radial position of the head is selected so as to coincide with a servo null.

5. A method according to claim 1, wherein the track is concentric with the disk, and the plurality of servo nulls are circumferentially spaced and have different radial positions at each circumferential position.

6. A method according to claim 1, wherein the servo nulls are evenly spaced on the disk.

7. A method according to claim 1, wherein the positions of the servo nulls extend, successively in a single radial direction on going round the track.

8. A method according to claim 1, wherein the radial positions of the servo nulls vary linearly with circumferential position.

9. A method according to claim 1, wherein the positions of the servo nulls define at least part of at least one spiral of servo nulls on the disk.

10. A method according to claim 9, wherein the pitch of the spiral is the width of the track.

11. A method according to claim 1, wherein the servo null locus is concentric with the disk.

12. A method according to claim 11, wherein the track defines a sine wave.

13. A method according to claim 12, wherein the sine wave has a wavelength equal to the track circumference.

14. A method according to claim 1, wherein the disk is initially free of servo bursts, the method comprising performing, before step (a), the step of writing said servo bursts to the disk.

15. A method of testing a read/write head, the method comprising:
   moving the head to a desired position relative to a track of a disk according to the method of claim 1; and,
   testing the head.

16. Apparatus for testing a read/write head, the apparatus comprising:
   a disk having a track, wherein the track has a plurality of servo bursts defining a plurality of servo nulls for the track, the servo nulls being positioned such that there are servo nulls at more than four different radial positions relative to the track, the servo nulls defining a predetermined locus having a known position relationship with the track, the locus extending across the radial extent of the track;
   a positioner for positioning a said head over a radial position on the disk;
   a processor arranged to:
      (a) receive a desired radial head position relative to the track;
      (b) determine a target null position on the null locus corresponding to said desired radial position of the head relative to the track in accordance with said known position relationship;
      (c) detect the position of at least one servo null with the head;
      (d) determine from at least one detected servo null position the position error of the head relative to the target null position; and,
      (e) generate a position error signal in accordance with the position error; and,
   a feedback controller arranged to receive said position error signal as a feedback input, and to cause said positioner to position said head so as to reduce said position error signal to zero,
   wherein the processor is arranged in step (b) to detect the position of a plurality of servo nulls, and in step (c) to interpolate between said plurality of null positions in order to find said position error, said interpolation being calculated in accordance with the known position relationship.

* * * * *